US008812946B1

(12) United States Patent
Kopylov et al.

(10) Patent No.: US 8,812,946 B1
(45) Date of Patent: Aug. 19, 2014

(54) SYSTEMS AND METHODS FOR RENDERING DOCUMENTS

(75) Inventors: Igor Kopylov, Brooklyn, NY (US); Michael Frederick, New York, NY (US)

(73) Assignee: Google Inc., Mountain View, CA (US)

( * ) Notice: Subject to any disclaimer, the term of this patent is extended or adjusted under 35 U.S.C. 154(b) by 4 days.

(21) Appl. No.: 13/275,093

(22) Filed: Oct. 17, 2011

(51) Int. Cl.
*G06F 17/21* (2006.01)

(52) U.S. Cl.
USPC ........... 715/202; 715/205; 715/209; 715/234; 715/235; 715/236; 715/239

(58) Field of Classification Search
USPC .......... 715/202, 205, 209, 234, 235, 236, 239
See application file for complete search history.

(56) References Cited

U.S. PATENT DOCUMENTS

| | | | |
|---|---|---|---|
| 5,231,577 A | 7/1993 | Koss | |
| 5,408,470 A | 4/1995 | Rothrock et al. | |
| 5,708,826 A * | 1/1998 | Ikeda et al. | 715/209 |
| 5,758,358 A | 5/1998 | Ebbo | |
| 5,761,669 A | 6/1998 | Montague et al. | |
| 5,793,966 A | 8/1998 | Amstein et al. | |
| 5,799,325 A * | 8/1998 | Rivette et al. | 715/209 |
| 5,819,304 A | 10/1998 | Nilsen et al. | |
| 6,049,664 A * | 4/2000 | Dale et al. | 717/174 |
| 6,061,697 A | 5/2000 | Nakao | |
| 6,073,144 A | 6/2000 | van Hoff | |
| 6,243,706 B1 | 6/2001 | Moreau et al. | |
| 6,327,584 B1 | 12/2001 | Xian et al. | |
| 6,341,305 B2 | 1/2002 | Wolfe | |
| 6,349,308 B1 | 2/2002 | Whang et al. | |
| 6,349,314 B1 | 2/2002 | Patel | |
| 6,377,957 B1 | 4/2002 | Jeyaraman | |
| 6,418,441 B1 * | 7/2002 | Call | 705/23 |
| 6,501,779 B1 * | 12/2002 | McLaughlin et al. | 372/52 |
| 6,766,333 B1 | 7/2004 | Wu et al. | |
| 7,031,954 B1 | 4/2006 | Kirsch | |
| 7,035,910 B1 | 4/2006 | Dutta et al. | |
| 7,069,502 B2 | 6/2006 | Numata et al. | |
| 7,162,693 B2 | 1/2007 | Yamanaka et al. | |
| 7,263,497 B1 | 8/2007 | Wiser et al. | |
| 7,305,613 B2 | 12/2007 | Oezgen | |
| 7,350,142 B2 * | 3/2008 | Kraft et al. | 715/210 |
| 7,437,421 B2 | 10/2008 | Bhogal et al. | |
| 7,478,330 B1 | 1/2009 | Branson et al. | |
| 7,491,399 B2 | 2/2009 | Vakharia | |
| 7,529,778 B1 | 5/2009 | Dewey et al. | |
| 7,634,728 B2 | 12/2009 | Kraft | |
| 7,656,543 B2 | 2/2010 | Atkins | |
| 7,667,862 B2 | 2/2010 | Ziegler et al. | |

(Continued)

OTHER PUBLICATIONS

"File;" Microsoft Computer Dictionary; May 1, 2002; Microsoft Press; Fifth Edition; p. 266.*
Bibi et al., "A Platform for Delivering Multimedia Presentations on Cultural Heritage," 2010 14th Panhellenic Conference on Informatics, pp. 175-179.
Ellis et al., "Concurrency Control in Groupware Systems," ACM 1989, pp. 399-407.

(Continued)

*Primary Examiner* — Andrew Dyer
(74) *Attorney, Agent, or Firm* — Ropes & Gray LLP

(57) ABSTRACT

Generally, the systems and methods described herein are directed to rendering a document containing textual elements and graphical elements. The systems and methods include separating the graphical elements from the textual elements, and generating a bitmap rendering of the graphical elements and an HTML rendering of the textual elements. The HTML rendering may then be overlaid on the bitmap rendering to generate a composite document having textual elements that are accessible to screen reader software.

20 Claims, 6 Drawing Sheets

(56) References Cited

U.S. PATENT DOCUMENTS

| | | | |
|---|---|---|---|
| 7,680,932 | B2 | 3/2010 | Defaix et al. |
| 7,698,379 | B2 | 4/2010 | Dutta et al. |
| 7,774,703 | B2 | 8/2010 | Junuzovic et al. |
| 7,890,928 | B2 | 2/2011 | Patrudu |
| 8,019,780 | B1 | 9/2011 | Pinkerton et al. |
| 8,151,204 | B2 | 4/2012 | Lusen et al. |
| 8,266,534 | B2 | 9/2012 | Curtis et al. |
| 8,332,815 | B2 | 12/2012 | Balfe et al. |
| 2001/0037346 | A1* | 11/2001 | Johnson ........................ 707/513 |
| 2002/0032701 | A1 | 3/2002 | Gao et al. |
| 2002/0035580 | A1 | 3/2002 | Tanabe |
| 2002/0051185 | A1* | 5/2002 | Yamaguchi et al. ......... 358/1.15 |
| 2002/0133492 | A1* | 9/2002 | Goldstein et al. ............... 707/10 |
| 2002/0174085 | A1 | 11/2002 | Nelson et al. |
| 2002/0194302 | A1 | 12/2002 | Blumberg |
| 2003/0037076 | A1 | 2/2003 | Bravery et al. |
| 2003/0037303 | A1 | 2/2003 | Bodlaender et al. |
| 2003/0084078 | A1 | 5/2003 | Torii et al. |
| 2003/0105719 | A1 | 6/2003 | Berger et al. |
| 2003/0145279 | A1* | 7/2003 | Bourbakis et al. ............. 715/511 |
| 2004/0044965 | A1 | 3/2004 | Toyama et al. |
| 2004/0085354 | A1 | 5/2004 | Massand |
| 2004/0088653 | A1 | 5/2004 | Bell et al. |
| 2004/0133444 | A1 | 7/2004 | Defaix et al. |
| 2004/0215672 | A1 | 10/2004 | Pfitzner |
| 2004/0215825 | A1 | 10/2004 | Pfitzner |
| 2004/0215826 | A1 | 10/2004 | Pfitzner |
| 2004/0216090 | A1 | 10/2004 | Kaler et al. |
| 2004/0248612 | A1 | 12/2004 | Lee et al. |
| 2004/0255005 | A1* | 12/2004 | Spooner ........................ 709/218 |
| 2005/0055337 | A1 | 3/2005 | Bebo et al. |
| 2005/0091291 | A1 | 4/2005 | Kaler et al. |
| 2005/0125461 | A1 | 6/2005 | Filz |
| 2005/0131887 | A1 | 6/2005 | Rohrabaugh et al. |
| 2005/0144256 | A1 | 6/2005 | Blumberg |
| 2005/0185636 | A1 | 8/2005 | Bucher |
| 2005/0200896 | A1* | 9/2005 | Narusawa et al. ........... 358/1.18 |
| 2006/0031751 | A1 | 2/2006 | Ehud |
| 2006/0075332 | A1 | 4/2006 | Fairweather et al. |
| 2006/0101071 | A1 | 5/2006 | Henderson |
| 2006/0149831 | A1 | 7/2006 | Dutta et al. |
| 2006/0200755 | A1 | 9/2006 | Melmon et al. |
| 2006/0230344 | A1 | 10/2006 | Jennings et al. |
| 2007/0033654 | A1 | 2/2007 | Wilson |
| 2007/0061714 | A1 | 3/2007 | Stuple et al. |
| 2007/0070066 | A1 | 3/2007 | Bakhash |
| 2007/0186157 | A1 | 8/2007 | Walker et al. |
| 2007/0208992 | A1 | 9/2007 | Koren |
| 2007/0220068 | A1 | 9/2007 | Thompson et al. |
| 2007/0288637 | A1 | 12/2007 | Layton et al. |
| 2008/0028302 | A1 | 1/2008 | Meschkat |
| 2008/0040659 | A1* | 2/2008 | Doyle ............................ 715/236 |
| 2008/0059417 | A1 | 3/2008 | Yamada et al. |
| 2008/0059539 | A1 | 3/2008 | Chin et al. |
| 2008/0082604 | A1 | 4/2008 | Mansour et al. |
| 2008/0126943 | A1 | 5/2008 | Parasnis et al. |
| 2008/0127212 | A1 | 5/2008 | Nakamizo et al. |
| 2008/0222273 | A1* | 9/2008 | Lakshmanan et al. ........ 709/219 |
| 2008/0222522 | A1* | 9/2008 | Morales ........................ 715/276 |
| 2009/0055755 | A1 | 2/2009 | Hicks et al. |
| 2009/0089664 | A1* | 4/2009 | Wagner et al. ................ 715/255 |
| 2009/0112953 | A1 | 4/2009 | Barsness et al. |
| 2009/0112990 | A1 | 4/2009 | Campbell et al. |
| 2009/0119572 | A1 | 5/2009 | Koivunen |
| 2009/0132907 | A1 | 5/2009 | Shao et al. |
| 2009/0164620 | A1 | 6/2009 | Ziegler et al. |
| 2009/0307585 | A1 | 12/2009 | Tranchant et al. |
| 2010/0005410 | A1 | 1/2010 | Pang |
| 2010/0030578 | A1 | 2/2010 | Siddique et al. |
| 2010/0050089 | A1* | 2/2010 | Kim et al. ..................... 715/749 |
| 2010/0070852 | A1 | 3/2010 | Li |
| 2010/0083096 | A1 | 4/2010 | Dupuis-Latour et al. |
| 2010/0205230 | A1 | 8/2010 | Simeonov et al. |
| 2010/0218099 | A1 | 8/2010 | van Melle et al. |
| 2010/0229086 | A1 | 9/2010 | Howell et al. |
| 2010/0235763 | A1 | 9/2010 | Massand |
| 2010/0245256 | A1 | 9/2010 | Estrada et al. |
| 2010/0251122 | A1 | 9/2010 | Lee et al. |
| 2010/0281076 | A1 | 11/2010 | Pan et al. |
| 2010/0309436 | A1 | 12/2010 | Allen, Jr. et al. |
| 2010/0318894 | A1 | 12/2010 | Billharz et al. |
| 2011/0035661 | A1* | 2/2011 | Balinsky et al. .............. 715/243 |
| 2011/0066957 | A1 | 3/2011 | Prats et al. |
| 2011/0078246 | A1 | 3/2011 | Dittmer-Roche |
| 2011/0085211 | A1 | 4/2011 | King et al. |
| 2011/0099093 | A1 | 4/2011 | Mills |
| 2011/0164043 | A1 | 7/2011 | Arora et al. |
| 2011/0179427 | A1 | 7/2011 | Krishnamoorthy et al. |
| 2011/0219331 | A1 | 9/2011 | DeLuca et al. |
| 2011/0252339 | A1 | 10/2011 | Lemonik et al. |
| 2011/0264712 | A1 | 10/2011 | Ylonen |
| 2011/0282933 | A1 | 11/2011 | Schmier |
| 2011/0296299 | A1 | 12/2011 | Parker |
| 2012/0117406 | A1 | 5/2012 | Eun |
| 2012/0131483 | A1 | 5/2012 | Archer et al. |

OTHER PUBLICATIONS

Huang et al., "A General Purpose Virtual Collaboration Room," Google 1999, pp. 1-9.

Kindberg, Mushroom: A Framework for Collaboration and Interaction across the Internet, Google 1996, pp. 1-11.

Pacull et al., Duplex: A Distributed Collaborative Editing Environment in Large Scale, ACM 1994, pp. 165-173.

"Simultaneously edit a presentation with other authors," by MicrosoftTM Office: MAC, published Nov. 11, 2010, pp. 1-4.

Krieger, "Documents, Presentations, and Workbooks: Using Microsoft® Office to Create Content That Gets Noticed," published May 2011, pp. 1-104.

Muivany, "What's Going on in Indexing," ACM 1997, pp. 10-15.

Munteaunu et al., "Collaborative Editing for Improved Usefulness and Usability of Transcript-Enhanced Webcasts," ACM 2008, pp. 373-382.

Raggett, Dave, "Slidy—a web based alternative to Microsoft PowerPoint," published 2006, pp. 1-13.

Taylor, "Cool Apple Keynote Presentation Tricks and Tips," published Apr. 2011, p. 1-5.

Advisory Action dated Sep. 7, 2012 for U.S. Appl. No. 13/274,723 pp. 1-2.

Final Office Action dated May 31, 2012 for U.S. Appl. No. 13/274,720 pp. 1-13.

Final Office Action dated Jun. 1, 2012 for U.S. Appl. No. 13/274,797 pp. 1-16.

Final Office Action dated Jun. 20, 2012 for U.S. Appl. No. 13/274,723 pp. 1-18.

Final Office Action dated Dec. 7, 2012 for U.S. Appl. No. 13/275,123 pp. 1-14.

Non Final Office Action dated Aug. 31, 2012 for U.S. Appl. No. 13/275,101 pp. 1-7.

Non-Final Office Action dated Jan. 11, 2012 for U.S. Appl. No. 13/274,797 pp. 1-12.

Non-Final Office Action dated Jan. 19, 2012 for U.S. Appl. No. 13/274,716 pp. 1-9.

Non-Final Office Action dated Feb. 17, 2012 for U.S. Appl. No. 13/275,123 pp. 1-17.

Non-Final Office Action dated Feb. 29, 2012 for U.S. Appl. No. 13/274,723 pp. 1-13.

Non-Final Office Action dated Mar. 1, 2012 for U.S. Appl. No. 13/275,101 pp. 1-6.

Non-Final Office Action dated Jun. 12, 2012 for U.S. Appl. No. 13/274,716 pp. 1-13.

Non-Final Office Action dated Dec. 30, 2011 for U.S. Appl. No. 13/274,720 pp. 1-12.

Final Office Action dated Nov. 16, 2012 for U.S. Appl. No. 13/274,716 pp. 1-7.

* cited by examiner

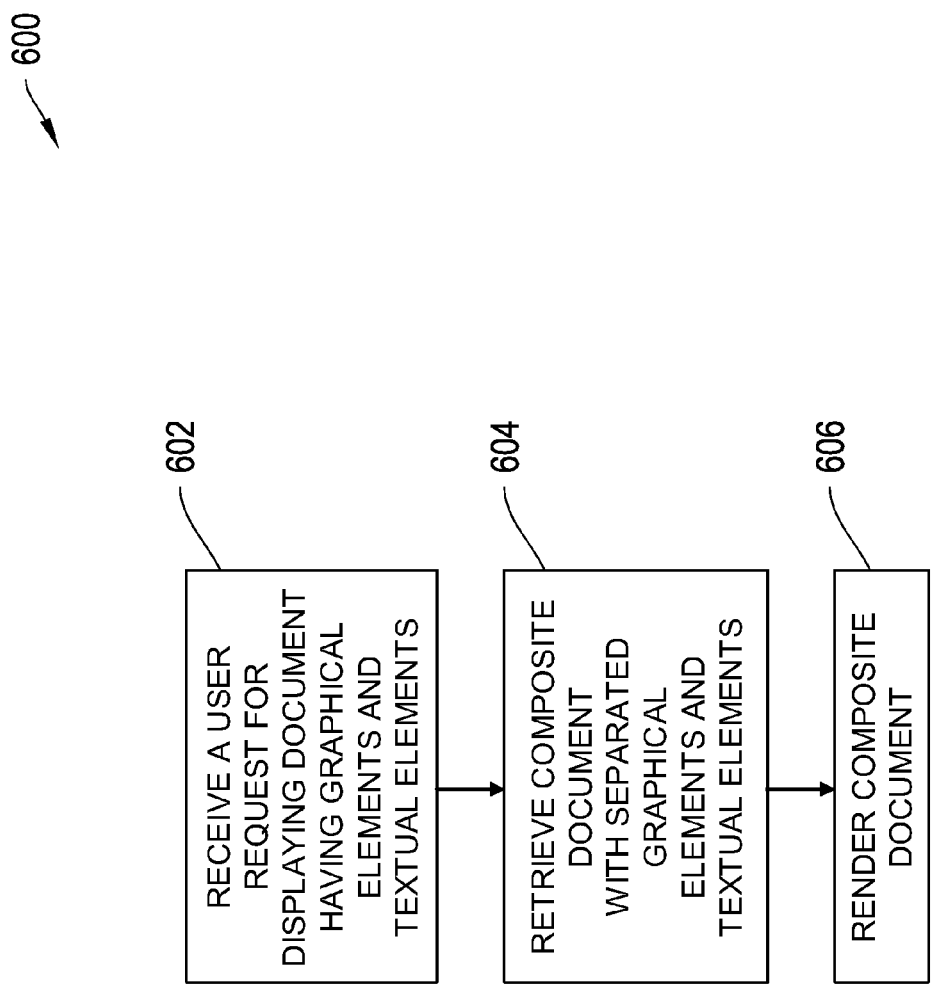

SYSTEMS AND METHODS FOR RENDERING DOCUMENTS

BACKGROUND

Online web applications have been developed which have the ability for a number of users, potentially at physically remote locations relative to one another, to easily collaborate, create and modify documents. Documents created by such web applications typically have media content including text, pictures, embedded audio and video, and other rich media and interactive content. These documents can be displayed to users via multimedia web pages on web browsers.

One problem with the use of such technologies, however, is that sightless users who wish to view documents with multimedia content are limited by the capabilities in existing screen reader software to read the updated content. Screen readers improve the readability of content on web pages by reading web page text in a linear, top-to-bottom fashion, outputting this content as audio to the user. Screen readers currently in use, however, cannot extract web page from multimedia documents in an efficient manner while still maintaining the fidelity of the multimedia.

There is no existing technology that has readily enabled users of screen readers or other software assistance programs to view such multimedia documents.

SUMMARY

Current web browsers typically render multimedia documents in Scalable Vector Graphics (SVG) code, which provides for high fidelity in graphics when displayed in web browser windows. Screen readers, however, typically cannot extract textual information from SVG-based webpages. As a work-around, current screen readers convert the entire multimedia documents into Hypertext Markup Language (HTML) code and attempt to extract textual information. This process is both laborious and imperfect because the document's graphics lose fidelity when converted to HTML code. The present disclosure solves this problem rendering the document's graphical elements separately from the document's textual elements. In many aspects, the systems and methods described herein include generating a graphical rendering (e.g., bitmap, vector) of the graphical elements in a document, without any textual content, and separately, generating a screen reader friendly rendering (e.g., HTML rendering) of the textual content. According to the systems and methods described herein, the screen reader friendly rendering is overlaid on the graphical rendering to generate a composite document (e.g., composite HTML document) suitable for use with a screen reader while still maintaining the fidelity of the graphical elements. Although, the systems and methods of the present disclosure are at times described with reference to certain textual and graphical rendering formats such as HTML, vector and bitmap, it will be understood by one of ordinary skill in the art that other suitable textual and graphical rendering formats may be employed in other suitable applications, and that such other formats will not depart from the scope thereof.

More particularly, in one aspect, the systems and methods described herein include computerized methods for generating one or more screen reader compatible documents. The methods may include receiving, at a server, a raw document having one or more data objects including one or more graphical elements and one or more textual elements. The methods may then include generating, at a server, a graphical data file and a textual data file. The graphical data file may include only the one or more graphical elements and the textual data file may include only the one or more textual elements. The methods further include adding, at the server, formatting code to the textual data file to include the graphical data file, thereby generating a composite document. The composite document may include content and appearance similar to that of the raw document when rendered by a web-browser. The composite document may be screen reader compatible such that the textual elements in the composite documents are in a format capable of being accessed by a screen reader application. In certain embodiments, the graphical data file includes at least one of a vector image file, a bitmap image file, a compressed image file, an audio file, and a video file. The textual data file includes Hypertext Markup Language (HTML) code and/or Cascading Style Sheets (CSS) code.

In another aspect, the systems and methods described herein include computerized methods for generating an HTML-based document to be rendered by a web browser. The methods may first include receiving, at a server, a raw document having one or more data objects including one or more graphical elements and one or more textual elements. The methods may include generating, at a server, a graphical data file including the one or more graphical elements, and generating, at a server, a textual data file including the one or more textual elements; wherein the textual data file includes Hypertext Markup Language (HTML) data and Cascading Style Sheets (CSS) data. The method may further include adding, at the server, HTML and CSS data to the textual data file to include the graphical data file, thereby generating a composite document. In certain embodiments, the composite document has content and appearance similar to that of the raw document when rendered by a web-browser.

The methods may include sending the raw document from at least one of a stored remote database and the client computing device. The raw document may include one or more presentation slides, one or more spreadsheets and one or more word-processing document pages. The raw document may have graphical elements including non-textual elements including at least one of shapes, images, audio and video.

The step of generating the graphical data file may include generating at least one of a bitmap image file, a compressed image file, an audio file, and a video file. In certain embodiments, generating the graphical data file includes identifying the one or more graphical elements in the document and generating a graphical data file including only the one or more graphical elements.

The step of generating the textual data file may include identifying the one or more textual elements in the document and generating the textual data file having HTML data and CSS data representative of the content and appearance of only the one or more identified textual elements. In certain embodiments, the methods also include generating a vector data file including the one or more graphical elements and the one or more textual elements rendered as a scalable vector graphics (SVG) file.

According to the methods described herein, when generating the composite document, the graphical elements may be combined with the textual elements such that when viewing the document, the graphical elements and textual elements overlap. In certain embodiments, generating a composite document may include generating CSS code for aligning graphical elements with textual elements matching the alignment of the one or more graphical elements and the one or more textual elements in the raw document.

The methods may further include sending the composite document from the server to a web browser at a client computing device, and allowing a user, at a client computing device, to submit a request to make the raw document screen reader accessible, and in response to the user request sending the composite document to the client computing device.

In another aspect, the systems and methods described herein include methods for rendering a document. The methods may include receiving, at a client computing device, a user request for displaying a raw document having one or more graphical elements and one or more textual elements, and retrieving, at the client computing device, a composite document having HTML data and CSS data representative of the one or more graphical elements and the one or more textual elements. The methods may further include rendering the composite document in a web browser on the client computing device.

In certain embodiments, the user request is received via a web-application installed on the client computing device. The user request may include a selection of an icon made available to the user via a web browser on the client computing device. The web application may include at least one of online document processing application, an online document processing application and an online presentation application. The raw document may include at least one of a presentation slide, a spreadsheet and a word-processing document page.

The methods may further include creating and/or storing the raw document at the client computing device using a web application. Alternatively, the methods may include sending the raw document from the client computing device to a server for storage.

In other aspects, the systems and methods described herein include systems for generating a document. The systems may include a server and a client computing device. The server may be configured to receive a raw document having one or more data objects including one or more graphical elements and one or more textual elements, generate a graphical data file including the one or more graphical elements, and generate a textual data file including the one or more textual elements; wherein the textual data file includes Hypertext Markup Language (HTML) data and Cascading Style Sheets (CSS) data. The server may further be configured to add HTML and CSS data to the textual data file to include the graphical data file, thereby generating a composite document. In certain embodiments, the composite document has content and appearance similar to that of the raw document when rendered by a web-browser.

BRIEF DESCRIPTION OF THE DRAWINGS

The above and other advantages of the disclosure will be apparent upon consideration of the following detailed description, taken in conjunction with the accompanying drawings, in which like reference characters refer to like parts throughout, and in which:

FIG. 6 is a flow chart depicting a process, on the client side, for converting a raw document containing media content into a screen reader accessible composite document, according to an illustrative embodiment of the invention.

DETAILED DESCRIPTION

To provide an overall understanding of the disclosure, certain illustrative embodiments will now be described, including systems and methods for rendering and displaying a document on a plurality of client computing devices by a server. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
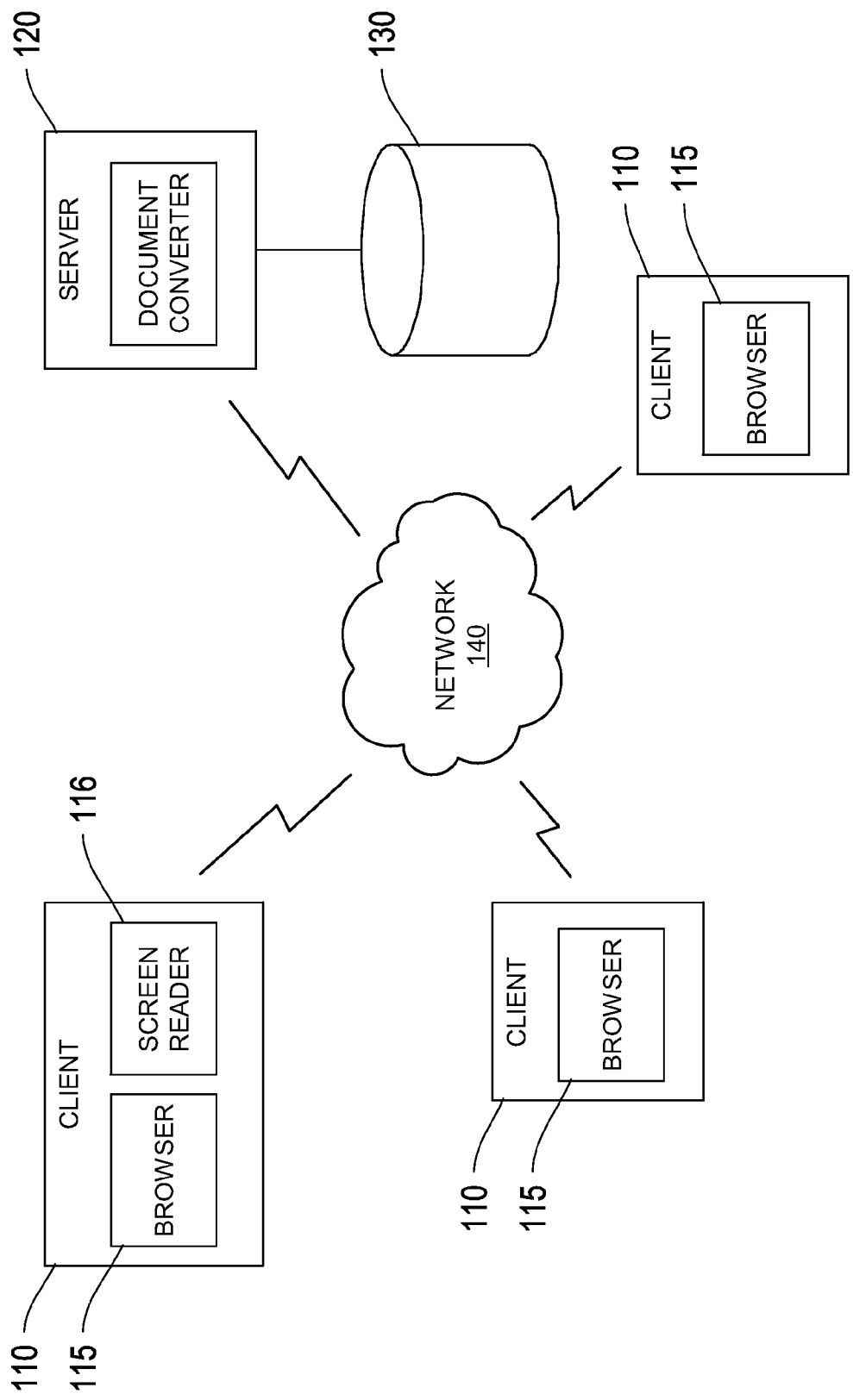
FIG. 1 is a block diagram depicting an online document rendering system, according to an illustrative embodiment of the invention.
Figure 2:
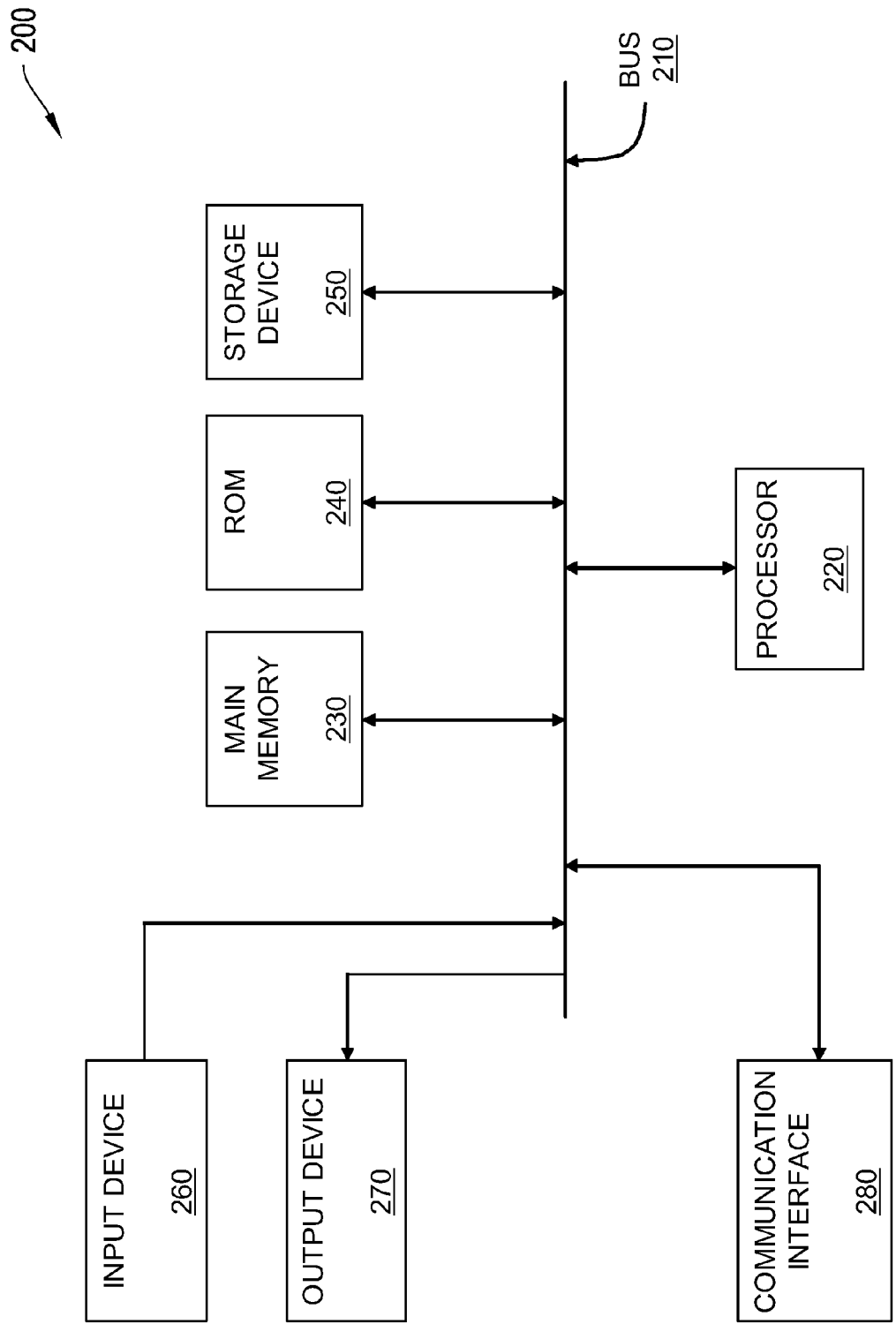
FIG. 2 is a block diagram depicting an exemplary computing device illustrated in FIG. 1.
Figure 3:
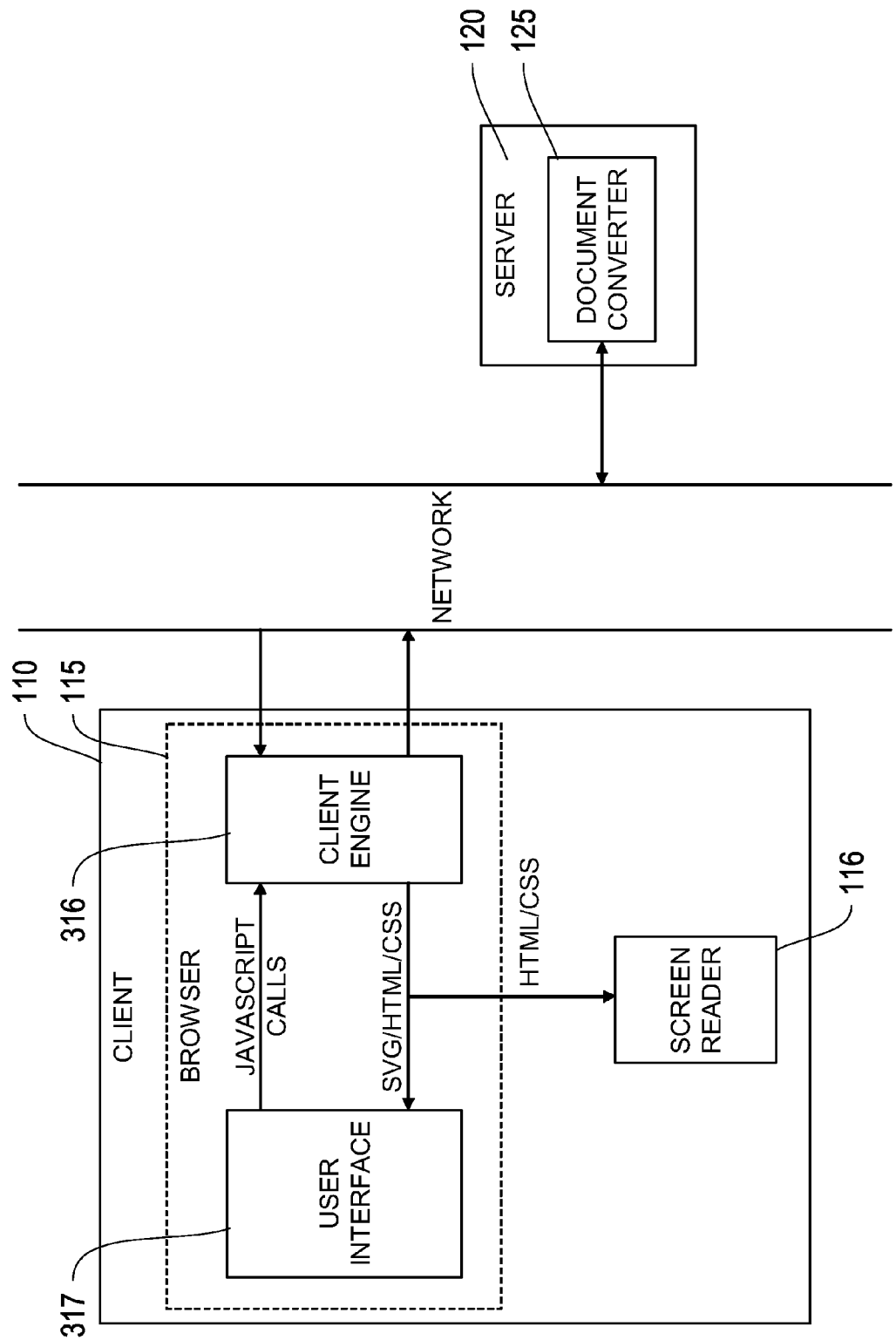
FIG. 3 is a block diagram depicting an implementation of the system of FIG. 1, according to an illustrative embodiment of the invention.

Generally, the systems and methods described herein are directed to rendering a document containing textual elements and graphical elements. The systems and methods include separating the graphical elements from the textual elements, and generating a bitmap rendering of the graphical elements and an HTML rendering of the textual elements. The HTML rendering may then be overlaid on the bitmap rendering to generate a composite document having textual elements that are accessible to screen reader software. FIGS. 1 and 2 provide an overview of an exemplary system, computing devices, and methods used to provide such an online document rendering application. FIGS. 3 and 4 describe in more detail one exemplary system and an exemplary implementation of the disclosed methods. FIGS. 5 and 6 provide exemplary methods, according to the present disclosure, for displaying and rendering a document.

General System Description

FIG. 1 is a block diagram depicting a document rendering system 100, according to an illustrative embodiment of the invention. System 100 includes multiple clients 110 that can connect to servers, such as server 120, via a network 140. Network 140 may include a local area network (LAN), a wide area network (WAN), a telephone network, such as the Public Switched Telephone Network (PSTN), an intranet, the Internet, or a combination of networks. Three clients 110 and one server 120 are illustrated as connected to network 140 for simplicity.

A client 110 may include a device, such as a personal computer, a laptop computer, a wireless telephone, a personal digital assistant (PDA), mobile devices, smart phones, touch-responsive tablet devices, or another type of computation or communication device. In certain embodiments, a client 110 may include display devices including a projection screen or television display. Users of clients 110 may access or receive information from server 120.

In the implementation shown, clients 110 may generally interact with server 120 such that clients 110, in conjunction with server 120, execute an online document processing application. Server 120 may include software, labeled as document converter component 125, to assist implementing the online document processing application. Documents created by users of clients 110 may be stored by server 120 in, for example, a database on a storage media 130. Although illustrated as a single device in FIG. 1, server 120 may be implemented as, for example, a single computing device or as multiple distributed computing devices. One of ordinary skill in the art will appreciate that whether a device is functioning as a server or a client often depends on the specific application being implemented. That is, whether a computing device is operating as a client or a server may depend on the context of the role of the computing device within the application. The relationship of client and server arises by virtue of computer programs running on the respective computers and having a client-server relationship to each other.

The interaction of clients 110 with server 120 may be through browser programs 115 at clients 110. For example, the online document processing application may be a web application that runs within browsers 115. In this manner, clients 110 may not be required to install any specific software to use the online application at client 110. When browsers or browser programs are discussed herein, these terms are intended to refer to any program that allows a user to browse markup documents (e.g., web documents), regardless of whether the browser program is a stand alone program or an embedded program, such as a browser program included as part of an operating system.

FIG. 2 is an exemplary diagram of computing device 200, such as one of clients 110 or server 120. Computing device 200 may include a bus 210, a processor 220, a main memory 230, a read only memory (ROM) 240, a storage device 250, an input device 260, an output device 270, and a communication interface 280. Bus 210 may include a path that permits communication among the components of computing device 200.

Processor 220 may include any type of processor, microprocessor, or processing logic that interprets and executes instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits a user to input information to computing device 200, such as a keyboard, a mouse, a pen, voice recognition and/or biometric mechanisms, etc. Output device 270 may include a conventional mechanism that outputs information to the user, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 140.

Document converter component 125 may be implemented in software and stored in a computer-readable medium, such as memory 230. A computer-readable medium may be defined as one or more physical or logical memory devices and/or carrier waves.

The software instructions defining the document converter component 125 may be read into memory 230 from another computer-readable medium, such as data storage device 250, or from another device via communication interface 280. The software instructions contained in memory 230 cause processor 220 to perform processes that will be described later. Alternatively, hardwired circuitry may be used in place of or in combination with software instructions to implement processes consistent with the present disclosure. Thus, implementations consistent with the principles of the systems and methods described are not limited to any specific combination of hardware circuitry and software.

Online Document Converter Application System

In certain embodiments, an online document converter system, as described herein, may be implemented as a distributed web application in connection with an online document processing application, in which portions of the application execute at one or more of clients 110 and at server 120. More specifically, clients 110 that wish to use the online document processing application may request the application from server 120. In response, server 120 may transmit portions of the document processing application for local execution at clients 110. The online document processing application may thus execute as a distributed application across server 120 and one or more of clients 110.

FIG. 3 is a block diagram depicting an implementation of the system 300 (or system 100 of FIG. 1), according to an illustrative embodiment of the invention. FIG. 3 depicts a client 110 having a browser 115 and screen reader application 116. As was described with reference to FIG. 1, system 300 may also include a plurality of other clients 110 having browsers 115 and respective screen readers 116.

The browser 115 includes a user interface 317 and a client engine 316. The client 110 is connected via a network 140 to a document converter component 125. Document converter component 125 includes a web and/or XML server that interfaces with clients 110. For example, document converter component 125 may receive HTTP requests from clients 110 and transmit XML data to clients 110. Additionally, document converter component 125 may perform the more substantive processing related to the document processing application.

In certain embodiments, portions of the online document processing application executes within clients 110. Client engine 316 may be implemented using, for example, JAVASCRIPT that is downloaded from server 120 when needed by client 110. User interface 317 may provide the final user interface that is displayed in browsers 115 based on, for example, HTML (hyper-text markup language) and CSS (cascading style sheets) data supplied from client engine 316. The client engine 316 may further supply HTML and CSS data to the screen reader 116.

User interface 317 and client engine 316, together, act to reduce the start-stop start-stop nature of traditional browser-based web applications, as client engine 316 adds a client-side layer that can handle many of the user interactions with user interface 317. Instead of loading a web page at the start of a user session, browser 115 may load client engine 316 from server 120 (or, alternatively, from a local cache). Client engine 316 may be responsible for both rendering the interface the user sees and communicating with server 120 on the user's behalf. Client engine 316 allows the user's interaction with the online application to happen asynchronously, i.e., independent of communication with server 120.

In certain embodiments, during operation, the user requests a document for viewing via browser 115 and/or via screen reader 116. The client engine 316 receives the request and submits a request to the server 120 via network 140. The server 120 obtains the document and passes it through the document converter 125. The document converter 125 separates the graphical elements in the document from the textual elements in the document. The document converter 125 then renders the graphical elements as a bitmap image and the textual elements as a textual data file in HTML and CSS code. The document converter 125 may combine the textual data file and the bitmap image by including HTML code within the textual data file calling the bitmap image file. In certain embodiments, the document converter 125 forms a composite document having HTML and CSS code pointing to and calling the graphical elements located in a bitmap rendering image. The composite document also includes HTML and CSS code renderings of the textual elements. The document converter 125 sends the composite document to the client engine 316, which then sends it to be rendered on the user interface 317 and/or screen reader 116.

In one implementation, the client-side operation of the online document converter application may be implemented using the known Asynchronous JAVASCRIPT and XML (AJAX) web development techniques, although one of ordinary skill in the art will recognize that other technologies could be used.

Methods

Figure 4C:
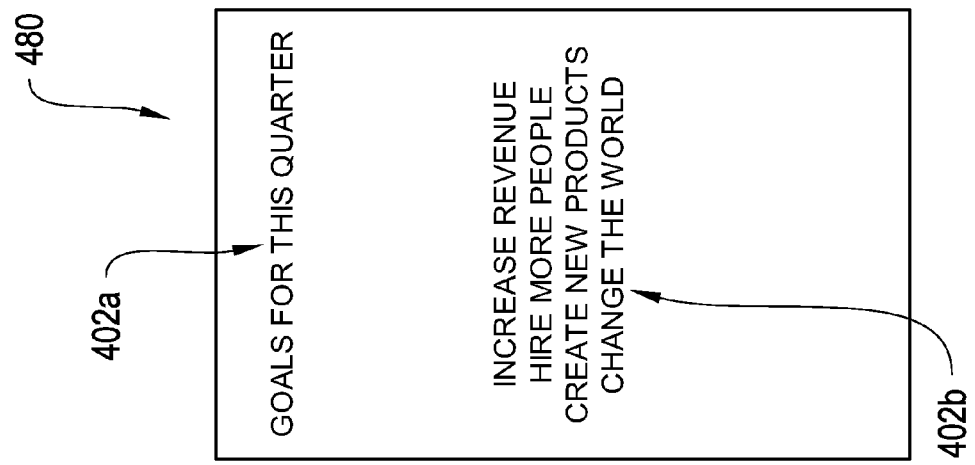
FIGS. 4A-4C depicts exemplary screenshots of a complete document, graphical data file and a textual data file, respectively, as rendered by the document rendering system of FIGS. 1 and 3.
Figure 4B:
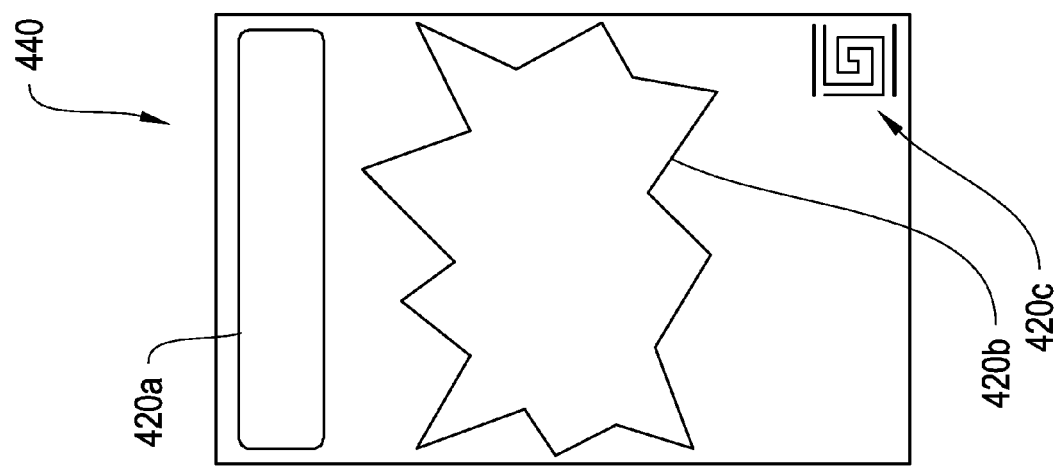
Figure 4A:
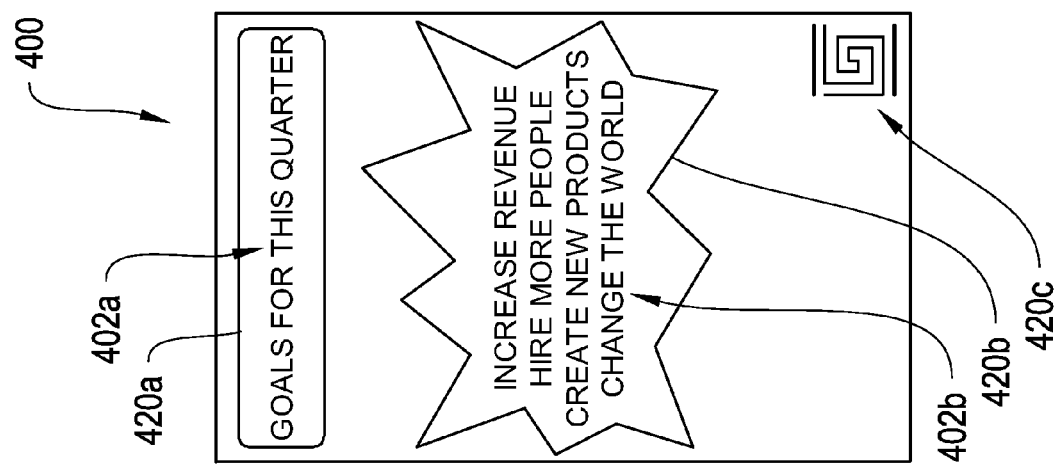
Figure 5:
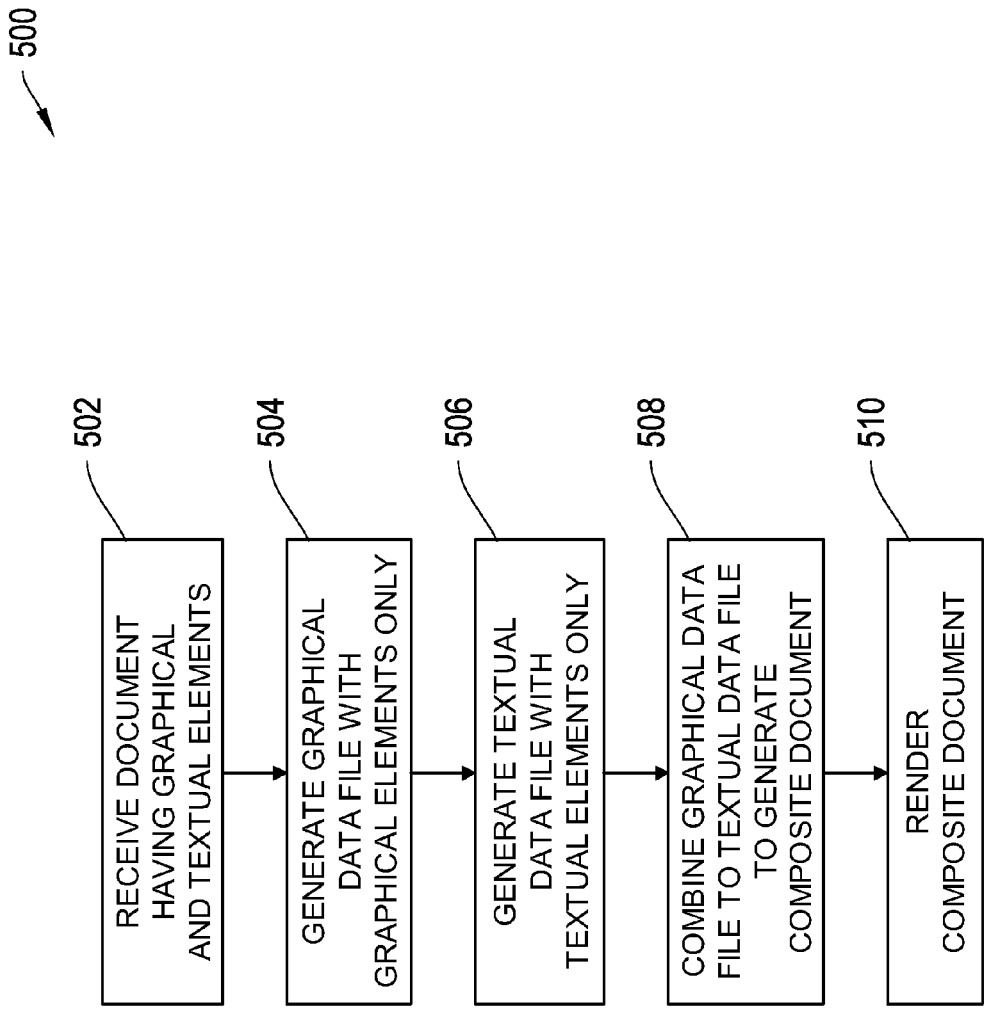
FIG. 5 is a flow chart depicting a process, on the server side, for converting a raw document containing media content into a screen reader accessible composite document, according to an illustrative embodiment of the invention.

FIGS. 4A-4C depict exemplary screenshots of a complete document, graphical data file and a textual data file, respectively, as rendered by the document rendering system of FIGS. 1 and 3. In particular, FIG. 4A depicts a screenshot of document 400, as would be visible to a user. The document 400 includes graphical elements 420a, 420b and 420c, and textual elements 402a and 402b. The system 100 of FIG. 1 and system 300 of FIG. 3 are configured with software and hardware to render document 400 with HTML and CSS code. The process for rendering multimedia documents is described in more detail with reference to FIGS. 5 and 6. FIGS. 4B and 4C depict screenshots of document as it is being rendered. In particular, FIG. 4B is a visualization of a graphical data file having only graphical elements 420a-420c, and without any of the textual elements 402a and 402b. FIG. 4C is a visualization of a textual data file 480 having only textual elements 402a and 402b, and without any graphical elements 420a-420c. During operation, the document converter 125 generates the graphical data file 440 and textual data file 480 from the document 400. The document converter 125 generates a composite image which can be visualized as overlaying the textual data file over the graphics data file. In software, the process for converting a document typically involves software and markup code.

FIG. 5 is a flow chart depicting a process, on the server side, for converting a raw document containing media content into a screen reader accessible composite document, according to an illustrative embodiment of the invention. As noted above, the client engine 316 sends the raw document data over network 140 to document converter 125 in server 120. The raw document, such as document 400, includes graphical elements and textual elements. The document converter 125 received the document (step 502) and generates a graphical data file with graphical elements (step 504). The graphical data file, similar to the data file visualized in FIG. 4B includes pixel and/or vector data. The graphical data file may be configured in a file format suitable for a web browser to render or rasterize. In certain embodiments, the graphical data file includes image objects and may have a file format selected from a list including at least one of Joint Photographic Experts Group (JPEG), Exchangeable Image File Format (EXIF), Tagged Image File Format (TIFF), Raw Image File Format (RAW), Portable Network Graphics (PNG), Graphics Interchange Format (GIF), WINDOWS BITMAP (BMP), Portable Bitmap File Format (PBM), WebP, ADOBE PHOTOSHOP DOCUMENT (PSD), ADOBE PDF, Computer Graphics Metafile (CGM), and Scalable Vector Graphics (SVG). In certain embodiments, the graphics data file may include other graphical elements including at least one of audio, video, animation, interactive applications.

The document converter 125 generates a textual data file (step 506). The textual data file, similar to the data file visualized in FIG. 4C, includes one or more textual elements including plain text components. In certain embodiments, the textual data file includes HTML code and CSS code for rendering the textual elements in a web browser.

Once the graphical data file and textual data file is created, the document converter 125 generates a composite document (step 508). The document converter 125 generates a composite document by either modifying the HTML and CSS coded textual data file or generating a new HTML document. In particular, the textual document includes HTML and CSS code to allow a web browser to render the content and appearance of text within the document. The textual data file includes HTML code for the heading—"Goals for this Quarter" and body text of items. The HTML code specifies the words in the text. The CSS code in the textual data file specifies appearance attributes of the text. In certain embodiments, attributes include type, size and color of text, position of text in the document and whether text includes other formatting such as strikethrough, underline and italics. The document converter 125 may modify this textual file by including the graphical data file within the HTML and CSS code of the textual document. For example the graphical data file may be added as a background within the textual data file. The document converter 125 may additionally include HTML and CSS code to position and adjust the appearance of the graphical data file.

The document converter 125 may send the composite document to the client 110 via network 140. The client 110 may render the composite document on a web browser. The client 110 may further send the composite document to a screen reader application for communicating to a user.

Within an online document processing application, on the client side, the user may have the option to view their document by rendering it from an SVG format or rendering it from a HTML and CSS format. FIG. 6 is a flow chart depicting a process, on the client side, for displaying a raw document containing media content into a screen reader accessible composite document, according to an illustrative embodiment of the invention. The client 110 includes software and hardware configured to receive a user request for displaying a document having graphical elements and textual elements (step 602). In response to the submitted request, the client 110 may retrieve a composite document having HTML and CSS code formed by overlaying textual elements on graphical elements as described with reference to FIG. 5 (step 604). The client 110 may include web browsers 115 for rendering the composite document and displaying to a user.

In certain alternative embodiments, the client 110 utilizes accessibility APIs currently available for web browsers for generating composite documents. In such embodiments, the accessibility API receives SVG coded data files containing graphical and textual elements. The accessibility API, being associated with a web browser at a particular client, may be configured to generate the textual data file.

It will be apparent to one of ordinary skill in the art that aspects of the present disclosure, as described above, may be implemented in many different forms of software, firmware, and hardware in the implementations illustrated in the figures. The actual software code or specialized control hardware used to implement aspects consistent with the principles of the disclosure is not limiting of the invention. Thus, the operation and behavior of the aspects of the disclosure were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Further, certain portions of the disclosure may be implemented as "logic" or a "component" that performs one or more functions. This logic may include hardware, such as an application specific integrated circuit or a field programmable gate array, software, or a combination of hardware and software.

The invention claimed is:

1. A computerized method for generating an online collaborative editable document to be rendered by a web browser, comprising:
    receiving, at a server, a raw online collaborative editable document, having one or more data objects including one or more graphical elements and one or more textual elements, wherein the raw online collaborative editable document is configured to be rendered in a graphical format in a web browser and the raw document includes one or more presentation slides, one or more spreadsheets, or one or more word-processing document pages;
    identifying, at the server, the one or more graphical elements from the raw document, and generating a graphical data file including the one or more identified graphical elements;
    identifying, at the server, the one or more textual elements from the raw document, and generating a textual data file including the one or more identified textual elements, wherein the textual data file includes Hypertext Markup Language (HTML) data and Cascading Style Sheets (CSS) data, wherein generating the textual data file including the one or more textual elements includes identifying the one or more textual elements in the document and generating the textual data file having HTML data and CSS data representative of content and appearance of only the one or more identified textual elements;
    identifying, at the server, alignment of the one or more graphical elements and alignment of the one or more textual elements;
    adding, at the server, HTML and CSS data to the textual data file to include the graphical data file, thereby generating a composite document, wherein the CSS data aligns graphical elements with textual elements matching the alignment of the one or more graphical elements and the one or more textual elements in the raw document; and
    wherein, when rendered by the web browser, the textual data file overlays the graphical data file such that alignment, content and appearance of one or more graphical elements and one or more textual elements of the composite document are the same as the alignment, content and appearance of the one or more graphical elements and the one or more textual elements of the raw document.

2. The computerized method of claim 1, further comprising sending the raw document from at least one of a stored remote database and the client computing device.

3. The computerized method of claim 1, wherein the graphical elements include non-textual elements including at least one of shapes, images, audio and video.

4. The computerized method of claim 1, wherein generating the graphical data file including the graphical elements includes generating at least one of a vector image file, a bitmap image file, a compressed image file, an audio file, and a video file.

5. The computerized method of claim 1, wherein generating the graphical data file includes identifying the one or more graphical elements in the document and generating a graphical data file including only the one or more graphical elements.

6. The computerized method of claim 1, further comprising generating a vector data file including the one or more graphical elements and the one or more textual elements rendered as a scalable vector graphics (SVG) file.

7. The computerized method of claim 1, wherein the graphical elements are combined with the textual elements such that when viewing the document, the graphical elements and textual elements overlap.

8. The computerized method of claim 1, further comprising sending the composite document from the server to a web browser at a client computing device.

9. The computerized method of claim 1, further comprising allowing a user, at a client computing device, to submit a request to make the raw document screen reader accessible, and in response to the user request sending the composite document to the client computing device.

10. A server-based system for generating an online collaborative editable document, comprising:
    a server comprising a processor configured to:
        receive a raw online collaborative editable document having one or more data objects including one or more graphical elements and one or more textual elements, wherein the raw online collaborative editable document is configured to be rendered in a graphical format in a web browser and the raw document includes one or more presentation slides, one or more spreadsheets, or one or more word-processing document pages;
        identify, the one or more graphical elements from the raw document, and generate a graphical data file including the one or more identified graphical elements;
        identify, the one or more textual elements from the raw document, and generate a textual data file including the one or more identified textual elements, wherein the textual data file includes Hypertext Markup Language (HTML) data and Cascading Style Sheets (CSS) data, wherein generating the textual data file including the one or more textual elements includes identifying the one or more textual elements in the document and generating the textual data file having HTML data and CSS data representative of content and appearance of only the one or more identified textual elements;
        identify an alignment of the one or more graphical elements and an alignment of the one or more textual elements;
        add HTML and CSS data to the textual data file to include the graphical data file, thereby generating a composite document, wherein the CSS data aligns graphical elements with textual elements matching the alignment of the one or more graphical elements and the one or more textual elements in the raw document; and
        wherein, when rendered by the web browser, the textual data file overlays the graphical data file such that alignment, content and appearance of one or more graphical elements and one or more textual elements of the composite document are the same as the alignment, content and appearance of the one or more graphical elements and the one or more textual elements of the raw document.

11. A computerized method for rendering an online collaborative editable document, comprising:

receiving, at a client computing device, a user request for displaying a raw online collaborative editable document having one or more graphical elements and one or more textual elements, wherein the raw online collaborative editable document is configured to be rendered in a graphical format in a web browser and the raw document includes at least one of a presentation slide, a spreadsheet and a word-processing document page, and wherein the user request is received via a web-application installed on the client computing device;

retrieving, at the client computing device, a composite document having HTML data and CSS data representative of the one or more graphical elements and the one or more textual elements, wherein the CSS data aligns graphical elements with textual elements matching the alignment of the one or more graphical elements and the one or more textual elements in the raw document; and rendering the composite document in a web browser on the client computing device;

wherein the composite document includes a combination of a graphical data file and a textual data file, the composite document including the textual data file having additional data to including the graphical data file, wherein the textual data file includes the one or more textual elements in the document and includes HTML data and CSS data representative of content and appearance of only the one or more identified textual elements; and wherein when rendered by the web browser, the textual data file overlays the graphical data file such that alignment, content and appearance of one or more graphical elements and one or more textual elements of the composite document are the same as the alignment, content and appearance of the one or more graphical elements and the one or more textual elements of the raw document.

12. The computerized method of claim 11, wherein the web-application includes at least one of an online document processing application, and an online presentation application.

13. The computerized method of claim 11, further comprising creating the raw document at the client computing device using a web application.

14. The computerized method of claim 11, further comprising storing the raw document in the client computing device.

15. The computerized method of claim 11, further comprising sending the raw document from the client computing device to a server for storage.

16. The computerized method of claim 11, wherein the user request includes a request to display the raw document in a format suitable for screen readers.

17. The computerized method of claim 11, wherein the user request includes a selection of an icon made available to the user via a web browser on the client computing device.

18. The computerized method of claim 11, wherein retrieving the composite document includes receiving the composite document from a server.

19. The computerized method of claim 11, further comprising sending the composite document to a screen reader application on the client computing device.

20. The computerized method of claim 19, further comprising rendering the composite document in the screen reader application on the client computing device.

* * * * *